March 21, 1950  L. ROBIN  2,501,408
FREEWHEEL MECHANISM
Filed June 9, 1945  5 Sheets-Sheet 1
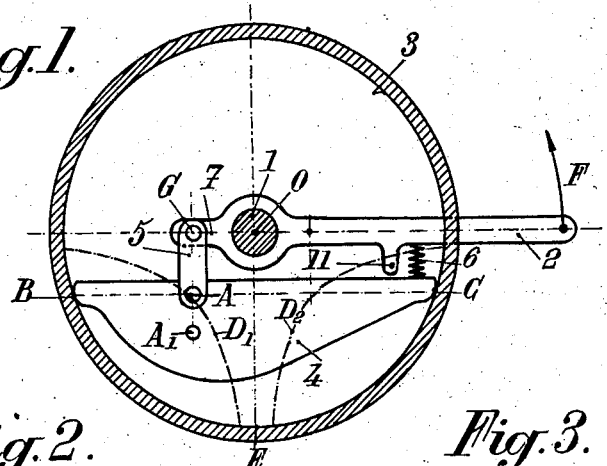
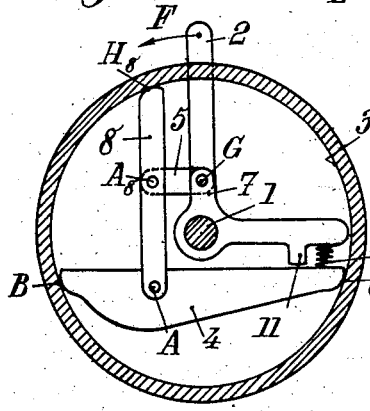
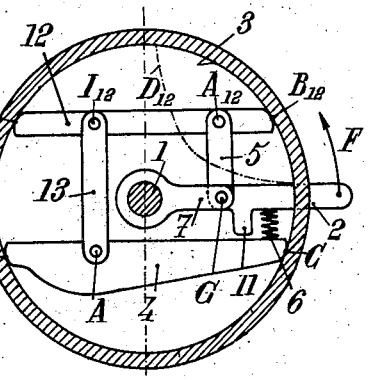
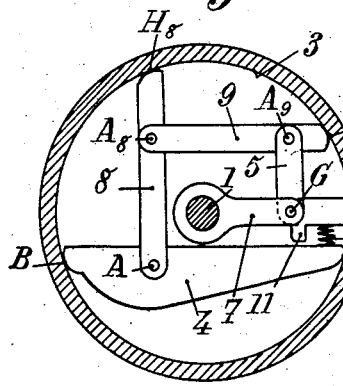
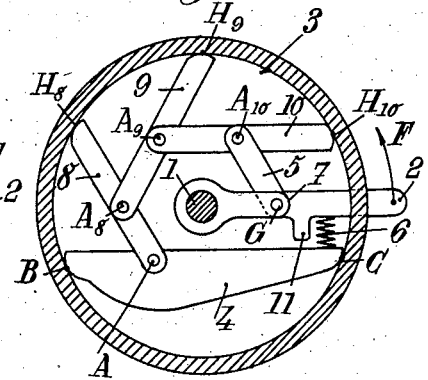
INVENTOR
LEO ROBIN,
BY Robert B Larson
ATTORNEY March 21, 1950

L. ROBIN 2,501,408

FREEWHEEL MECHANISM

Filed June 9, 1945

INVENTOR
LEO ROBIN,

BY Robert B. Larson
ATTORNEY

March 21, 1950 L. ROBIN 2,501,408
FREEWHEEL MECHANISM
Filed June 9, 1945 5 Sheets-Sheet 3

INVENTOR
LEO ROBIN,

BY Robert B Larson
ATTORNEY

March 21, 1950  L. ROBIN  2,501,408
FREEWHEEL MECHANISM

Filed June 9, 1945  5 Sheets-Sheet 4

INVENTOR
LEO ROBIN,

BY Robert B. Larson
ATTORNEY

March 21, 1950     L. ROBIN     2,501,408
FREEWHEEL MECHANISM
Filed June 9, 1945     5 Sheets-Sheet 5
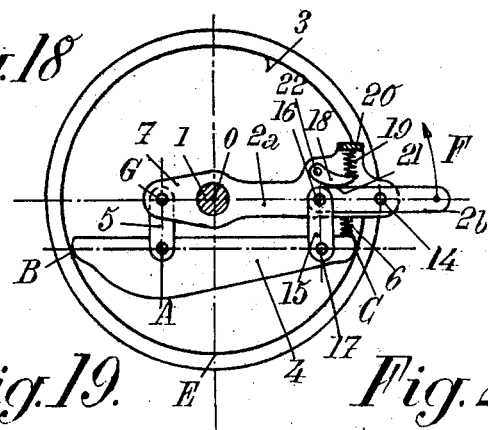
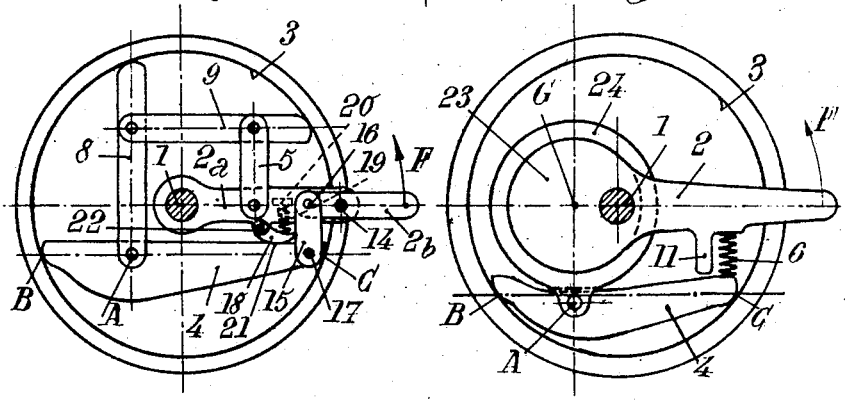
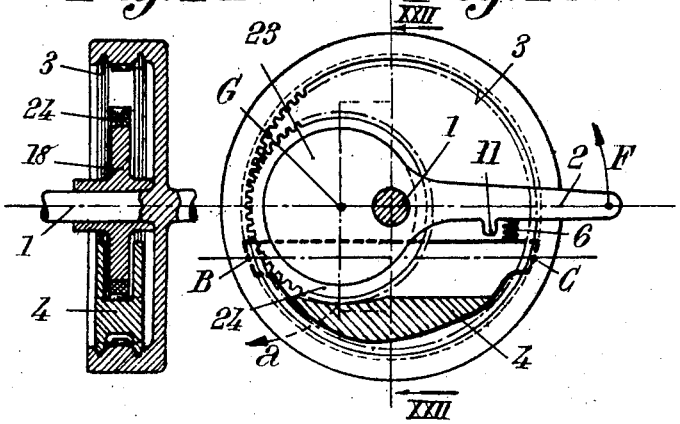
INVENTOR
LEO ROBIN,
BY
ATTORNEY Patented Mar. 21, 1950

2,501,408

UNITED STATES PATENT OFFICE 2,501,408

FREEWHEEL MECHANISM

Leo Robin, Albi, France

Application June 9, 1945, Serial No. 598,595
In France January 11, 1944

Section 1, Public Law 690, August 8, 1946
Patent expires January 11, 1964

16 Claims. (Cl. 192—45.1)

The present invention relates to free wheel mechanisms, that is to say mechanisms including two coaxial elements interconnected in such manner that they are automatically caused to drive each other for a given direction of relative rotation, whereas, for the opposed direction of relative rotation, they are free to move with respect to each other.

The invention is more especially, although not exclusively, concerned with such mechanisms of this type as are intended to undergo high frequency and large amplitude alternations of relative rotation direction under h'gh loads, which functional conditions are for instance those prevailing in the case of free wheel mechanisms incorporated in continuous change speed devices.

The object of the present invention is to provide a mechanism of this type which is better adapted to meet the requirements of practice than those used up to the present time.

Other objects of my invention will result from the following detailed description of some specific embodiments thereof.

Preferred embodiments of the present invention will be hereinafter described with reference to the accompanying drawings, given merely by way of example, and in which:

Figs. 1 to 8 inclusive are diagrammatical views of various embodiments of a free wheel mechanism according to the present invention;

Figures 14, 15:
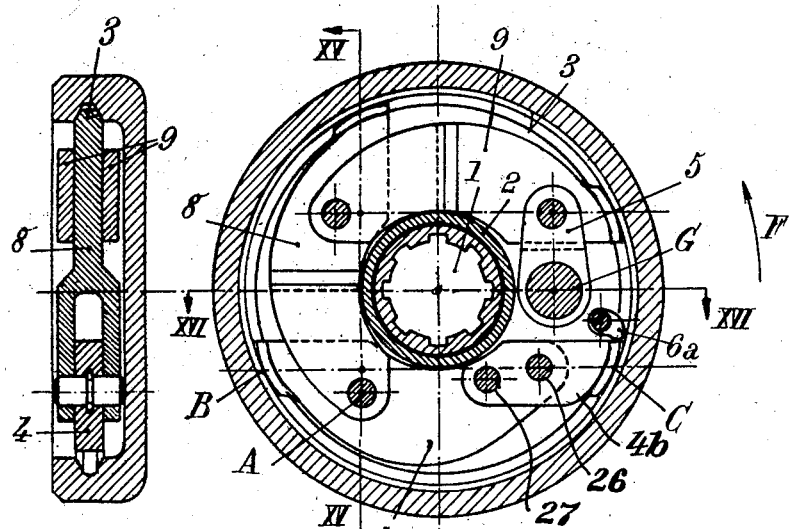
Figure 16:
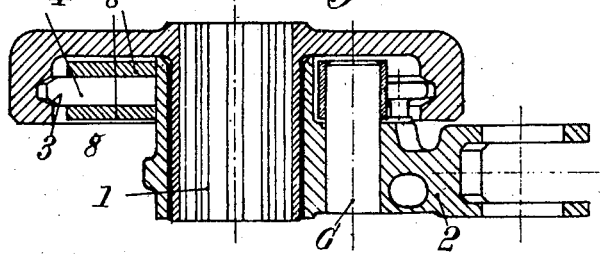
Figures 17, 23:
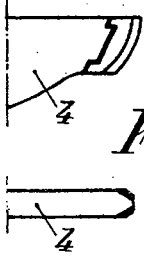
Figure 24:
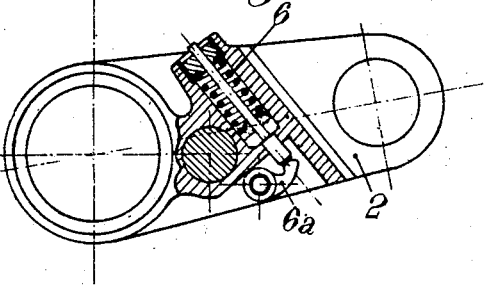

Figs. 13 to 16 respectively show, in end view during assembly, in cross section, and in section on the lines XV—XV and XVI—XVI of Fig. 14 another free wheel mechanism made on the principle illustrated by Fig. 4;

Fig. 17 is an elevational view, with parts in section, of an element of the above mentioned mechanism;

Figs. 18 to 21 diagrammatically show free wheel mechanisms made according to other embodiments of the invention;

Fig. 22 is a section on the line XXII—XXII of Fig. 21;

Figs. 23 and 24 show two embodiments of a detail of said mechanisms.

According to the invention, as illustrated by the drawings, a free wheel mechanism to be interposed between a first element (driving element) including an arm 2 having a reciprocating rotary motion about axis 0 and a second element (driven element) rigid with a shaft 1 the axis of which is 0, is made as follows:

The driven element is constituted by a drum, for instance a hollow steel cylindrical part the circular rim of which is shown at 3.

As for the driving element, it is constituted by an arm 2 pivoting about the axis 0 of said shaft 1 and which is operatively connected, either directly or indirectly with a cross piece 4 located for instance inside rim 3 and of a length smaller than the inner diameter of said rim.

Arm 2 and cross piece 4 are interconnected in such manner that, when arm 2 is urged in the direction that applies said cross piece against rim 3 (driving direction, as indicated by arrow F), this cross piece 4 is subjected to a thrust applied to a point A thereof such that, and with such a direction that said cross piece is wedged against the inner wall of rim 3.

It can be demonstrated that there exists a plurality of such points A, account being taken of the direction of the thrust and of the value of the friction coefficient between cross piece 4 and rim 3.

For instance, if it is supposed that the thrust in question is exerted in a direction at right angles to the cross piece and applied to a point thereof located on a straight line passing through the contact points B and C of said cross piece with rim 3, it can be shown that when the length of cross piece 4, supposed to remain parallel to itself, varies between a maximum equal to the inner diameter of rim 3 and a minimum equal to zero, it is possible to trace two curves $D_1$, $D_2$ (Fig. 1) symmetrically disposed on either side of the radius OE perpendicular to cross piece 4, these curves being the geometrical loci of the points beyond which a thrust exerted on cross piece 4 merely produces a sliding of the cross piece along the drum.

According to the driving direction that is chosen, one or the other of these curves is taken into account for instance, as it will be hereinafter supposed, curve $D_1$ located on the side of point B.

The thrust that is to cause the wedging of piece 4 with respect to rim 3 is transmitted to said piece 4 through any suitable means interposed between cross piece 4 and arm 2. Such means may be constituted by a cam or, preferably, a connecting rod 5, pivoted at both ends and in particular, in the simplest case, as shown by Fig. 1, to the cross piece at a point A located, on the convex side of curve $D_1$, between radius OE and said curve $D_1$.

On the other hand, elastic means, such as constituted by a spring 6, are interposed between arm 2 (or an element rigid with this arm) and cross piece 4 so as permanently to urge against rim 3, the end C of cross piece 4. This spring 6 must act on cross piece 4 at a point thereof such that the action of this spring releases the cross piece from wedging, that is to say at a point located on the concave side of curve $D_2$ (Fig. 1).

According to the simplest embodiment (Fig. 1), link 5 is pivoted, at the end thereof opposed to that where it is pivoted to cross piece 4, directly to a lever 7 rigid with arm 2 and at a point G such that, when said arm is rotated in the direction of arrow F, link 5 is pushed, perpendicularly to the cross piece in the desired direction for wedging the latter against rim 3. Preferably, lever 7 is arranged parallel to cross piece 4.

It will be readily understood that, when arm 2 is moved in the direction of arrow F, cross piece 4 is wedged against rim 3 and the driving and driven elements are coupled together. On the contrary, when arm 2 is moved in the opposed direction, cross piece 4 slides freely in contact with rim 3, any play being avoided owing to the action of spring 6 so that both ends B and C of this cross piece remain in contact with rim 3.

Figure 8:
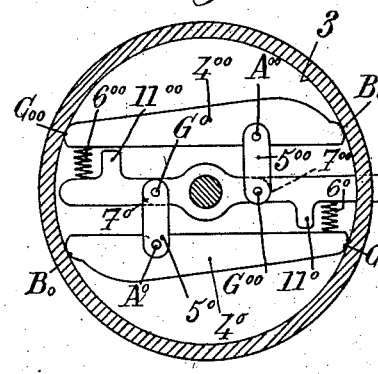

A plurality of devices similar to that which has just been described with reference to Fig. 1 might be mounted in parallel, as shown by Fig. 8, which shows two such devices the parts of which are designated by the same reference numerals, with digits "0" and "00", respectively.

I might also interpose, in series between lever 2 and cross piece 4, in addition to link 5 or any other equivalent part, other jointed elements, Fig. 2 shows an embodiment including one element, Figs. 3 and 4 another embodiment including two such elements, and Fig. 5 a third embodiment including three elements thus interposed between 2 and 4. In all these embodiments, the last element is pivoted to piece 4 at A, and the geometrical figure constituted by the supplementary system thus created includes as many bearing and wedging points on rim 3 as there are supplementary elements, whereby the mechanical structure constituted by lever 7, link 5, this supplementary system and cross piece 4 is practically indeformable, barring of course functional relative displacements.

According to a first series of embodiments (Figs. 2, 4 and 5), the supplementary system in question includes a supplementary element 8 which, under the effect of a thrust exerted on arm 2 in the driving direction, has one of its ends $H_8$ applied against rim 3, while the other end thereof is applied against the point A of cross piece 4. Points $H_8$ and A are located on a chord of the drum by which rim 3 is carried.

This supplementary element 8 may be directly acted upon at point A by link 5 or the like (Fig. 2).

But I may also, according to other embodiments of the invention, interpose between link 5 and element 8 any desired number of supplementary elements 9, 10, etc. analogous to said element 8, and therefore disposed along chords of said drum, adapted, under the effect of a thrust applied to arm 2 in the driving direction, to have one of their ends $H_9$, $H_{10}$, etc. applied against rim 3 and their other end applied against the preceding supplementary element, at a point $A_8$, $A_9$, etc. of this preceding element, the last of these elements (9 in the case of Fig. 4 and 10 in the case of Fig. 5) being itself acted upon at a point $A_9$, $A_{10}$, etc. by the element carried by lever 7, to wit link 5 in the embodiments illustrated by the drawings.

It will be readily understood that if, for each of the supplementary elements 8, 9, 10, there is traced, at their end $H_8$, $H_9$, $H_{10}$, etc., a curve analogous to the curve $D_1$ above described, it is not necessary to place points $A_8$, $A_9$, $A_{10}$, etc., between the corresponding curves in question and the radius at right angles to the supplementary element that is being considered. As a matter of fact, the wedging of the whole is ensured in all cases by cross piece 4 which must be acted upon at a point A located as above set forth.

According to a second series of embodiments (Fig. 3) the supplementary system in question includes a supplementary element or cross piece 12, analogous to cross piece 4, which, under the action of a thrust applied to arm 2 in the driving direction, has both of its ends $B_{12}$, $C_{12}$ applied against rim 3, along a chord of the drum. This cross piece 12 is subjected to the action of a link 5 or the like, pivoted to a point $A_{12}$ located on the concave side of the curve $D_{12}$ to be considered. On the other hand, cross piece 12 is connected to cross piece 4 through a link 13 (which constitutes in itself another supplementary element) interposed between a point $I_{12}$ of said cross piece 12 and the point A of cross piece 4. In this case, point $I_{12}$ must be so located that the resultant of the thrusts applied to cross piece 12 by links 5 and 13 produces, as a consequence of the wedging of cross piece 4, the wedging of cross piece 12.

Of course, I might dispose in series a plurality of systems constituted by parts identical to cross piece 12 and connecting link 13. In this case also, as in the above described series of embodiments, the wedging of the various supplementary cross pieces will take place under the combined effects of the driving effort and of the reaction due to the preliminary wedging of cross piece 4.

Whenever supplementary elements are provided, it is advantageous to interpose a spring, as above set forth, between cross piece 4 and lever 2, at 6.

It should be noted that, with the arrangement disclosed by Fig. 2, link 5 transmits to cross piece 4, through bar 8, both an effort in the longitudinal direction of said bar 8, that is to say perpendicular to said piece 4, and an effort parallel to the line BC of said piece and directed toward the left. This last mentioned effort has for its effect to reduce the tendency of point C to slide along rim 3. Consequently, with such an arrangement, and with the same radius of rim 3 and the same coefficient of friction as in the embodiment of Fig. 1, the desired operation can be obtained with a point A located at a greater distance from center 0 than in said embodiment. In other words, the curve $D_1$ above referred to is of flatter shape. This is advantageous since a greater space is available in the central part of the device, about shaft 1.

The same remarks apply to the embodiments of Figs. 4 and 5.

Figure 6:
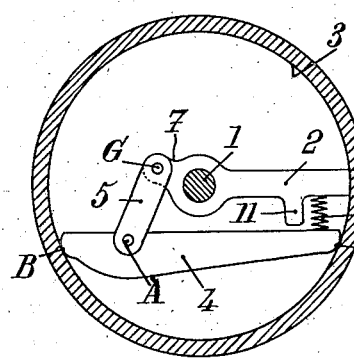
Figure 7:
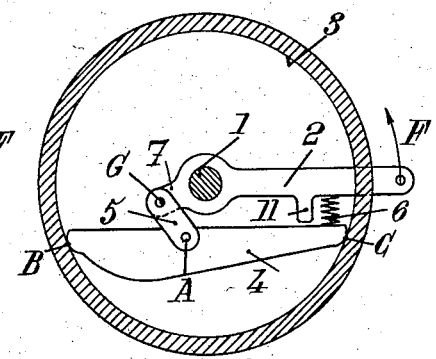

It should further be noted that link 5 may be oblique to the element with which it cooperates, as shown by Figs. 5, 6 and 7.

It is possible, in all cases, to trace the diagram of forces so as to permit of correctly determining the positions of point A and, eventually, $A_8$, $A_9$, $A_{10}$, etc. For instance, in the case of Fig. 6, the effort applied at A by link 5 is decomposed into a component perpendicular to cross piece 4 and an effort along line BC, in the direction from A toward B.

Figure 9:
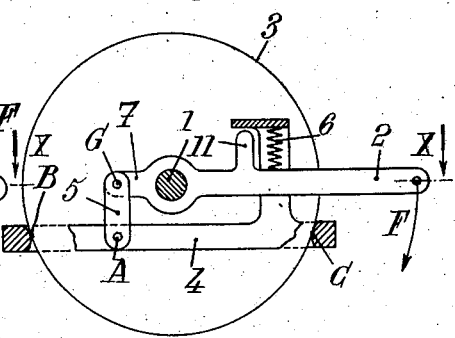
Figs. 9 and 10 are respectively an end view, with parts in section, and a sectional view on the line X—X of Fig. 9, of still another embodiment.
Figure 10:
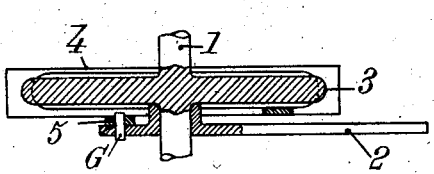

It should be well understood that cross piece 4 and, eventually, the supplementary elements cooperating therewith might be located on the outside of rim 3, as shown by Figs. 9 and 10. In this case, link 5 would exert a pull, and not a thrust, on the element cooperating therewith. Likewise, spring 6 must tend to urge piece 4 toward the axis of the system. For this purpose, it is interposed between arm 2 and a part rigid with said piece 4.

In all cases, it is advantageous to provide, between arm 2 and piece 4, an abutment 11, eventually adjustable, for limiting the relative angular displacement of these elements to the desired minimum value.

It will be readily understood that the eccentricities that can be adopted for the various elements of the apparatus depend to a considerable degree upon the coefficient of friction between piece 4 and rim 3.

Now, it is advantageous, both from the point of view of the resulting efforts in the rods and from the point of view of fatigue of the contact surfaces, to have a friction coefficient as high as possible so as to permit of employing great eccentricities.

Figure 11:
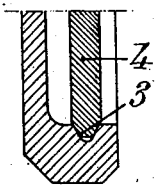
Fig. 11 is a part radial sectional view of a detail of construction of a mechanism made according to any of the embodiments of Figs. 1 to 8 inclusive.

In order to increase the friction, the active ends of the bars (this word including piece 4 and supplementary elements 8, 9, 10, etc.) are bevelled and a corresponding V-shaped groove is formed in rim 3, as shown by Fig. 11, the bevel angle being for instance 60°. With this angle, the friction is doubled. Of course, the eccentricity of the bars has a maximum value which is the higher as the friction effect is more considerable.

Figure 12:
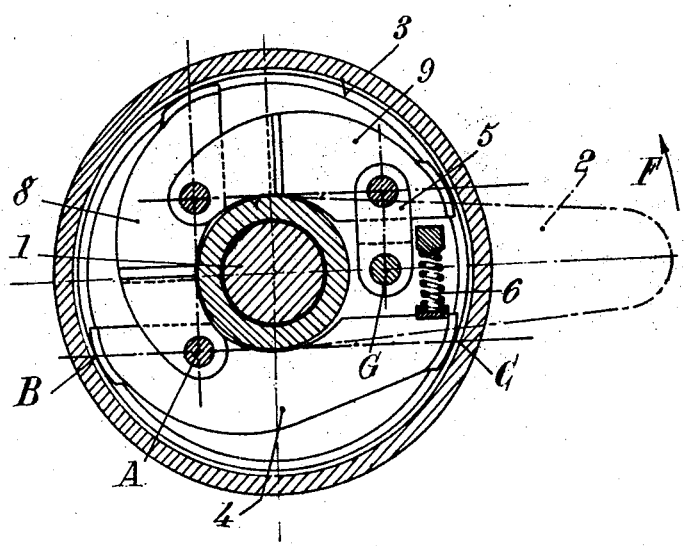
Fig. 12 is a transverse sectional view of a free wheel device made on the principle illustrated by Fig. 4.

Fig. 12 shows a practical embodiment of the free wheel device according to the invention, as diagrammatically illustrated by Fig. 4. In this construction, the bars have been given the form of beams capable of withstanding not only axial efforts but also bending stresses. On the other hand, the ends of the bars have been given a curvature of a radius smaller than that of the rim in order to ensure a correct transmission.

According to this construction, before lever 2 is inserted on shaft 1, there is a considerable play between thte respective bars, on the one hand, and said shaft 1 on the other hand. Consequently, said bars, and also link 5, can be pivoted inwardly, so as to facilitate their insertion in rim 3.

Lever 2, together with its hub, is then inserted on shaft 1, care being taken to insert pivot G in the link. Spring 6 can then be inserted.

The play that is provided between the bars and the hub of lever 2 is small, but however sufficient for avoiding friction of said bars against rim 3, when they are applied against said hub.

This arrangement has the advantage of limiting the play between the parts of the device during the free wheel return movement thereof. It constitutes an abutment for all the bars.

When, all other things being equal, shaft 1 is made of greater diameter and, accordingly, the radial thickness of the hub of lever 2 is smaller, difficulties might arise in the introduction of the bars and link 5 into proper positon, especially when the ends of the bars are of bevel-shaped section and are adapted to engage in one or several grooves provided in the rim.

Figure 13:
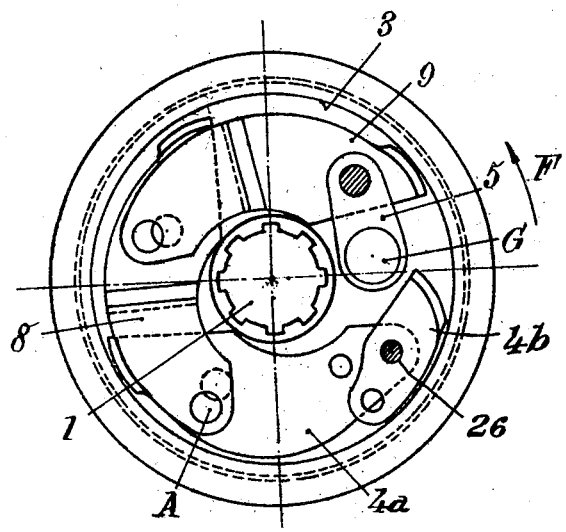

In this case, transverse piece 4 is advantageously made of two portions 4a and 4b, for instance as shown by Figs. 13 and 14, said portions being pivoted together about a pin 26 and adapted to be held in proper working position with respect to each other by locking means 27, constituted for instance by a pin engaged in corresponding holes of portions 4a and 4b when said portions are in line with each other as shown by Fig. 14.

The insertion in position of the various bars of the device is performed by folding up the two portions 4a, 4b and, eventually, by removing some of the pivot pins (Fig. 13).

When the elements are in position, the pins are inserted as shown by Fig. 14 and it is then possible to insert lever 2, with its hub, in position, while introducing pivot G into the corresponding housing of link 5.

In this embodiment, as in that of Fig. 12, the play between the hub of lever 2 and the bars is of a value just sufficient for avoiding friction of the ends of the bars against rim 3 during free wheel operation.

In should be noted that, in this embodiment, as shown by Figs. 14 and 17, the action of spring 6 on the end of transverse piece 4 is exerted through the intermediate of a rocking member 6a.

In all cases, the bars being subjected to important bending stresses, the pivots should advantageously be located in the neutral fibre. Now, without introducing any modification in the kinematic operation of the system, the pivots can be displaced at will in the bars, provided this displacement takes place along the line of application of each force.

Thus, in Fig. 1, the pivot that materializes point A might occupy any position along the longitudinal axis of link 5. For instance it might be located at $A_1$. This is true of all the other embodiments and for all the elements of the device. For instance, Fig. 14 shows an embodiment in which the positions of the pivots have been accordingly displaced.

It will be readily understood that the mechanisms which have just been described have the following advantages:

(a) During free wheel running operation, that is to say when lever 2 is moving in the direction opposed to that of arrow F, all the bars tend to apply themselves against the hub of said lever without producing friction therewith since said hub is rotating at the same speed, this inward movement of the parts being opposed to the action of the centrifugal force; and (b) When, on the contrary, the lever is moving in the direction of arrow F, the inertia of the bars has a favorable action since it tends to apply said bars against rim 3, this outward movement adding itself to the action of the centrifugal force.

It may be advantageous, especially concerning transverse member 4, to have the center of gravity thereof located between point E and the point of contact B thereof with the rim, because, in this case, the effort imparted at A tends first to apply the bar at C and thus helps the action of spring 6.

The same applies to the position of the center of gravity of any other bar.

It is also possible, according to the invention, to control in a positive manner, the effects of inertia and consequently to permit of further increasing the eccentricities of the bars.

For this purpose, arm 2 is advantageously designed in such manner that any effort exerted in the direction of arrow F produces a reaction directly applied to transverse piece 4 at a point thereof located between points A and C.

For this purpose, I may for instance, as shown by Fig. 18, make arm 2 of two portions 2a and 2b, pivoted together at 14. Portion 2a pivots about shaft 1 and carries lever 7, while portion 2b constitutes a lever the inner end of which acts on transverse piece 4 through a link 15, pivoted at 16 to portion 2b and at 17 to piece 4.

Consequently, when the free end of portion 2b is moved in the direction of arrow F, the effort is transmitted to transverse piece 4 through pivot 16, link 15 and pivot 17.

It is only after contact has been ensured between transverse piece 4 and rim 3 that an effort can be transmitted through lever 7 to point G, link 5, point A and transverse piece 4.

When an effort in a direction opposed to that of arrow F is applied to piece 2b, transverse piece 4 is moved away from rim 3 a distance determined by an abutment 11, of the type above described, or rather by an elastic abutment without play, which has the advantage of eliminating any noise or shock between the arm and the transverse piece, For this purpose, I may make use of a device constituted by a cam 18 pushed either against portion 2b, on the side of axis 16 (Fig. 18) or against transverse piece 4, on the side of point C (Fig. 19), through the action of a spring 19 or the like bearing against a seat 20 rigid with the portion 2a of the oscillating arm. This cam is so shaped and disposed that the ratio of lever arms 21—22 and 21—14 (21 being the point of contact of the cam with portion 2b or with transverse piece 4, and 22 being the point of pivoting of said cam on portion 2a) decreases when spring 19 is compressed.

With such an elastic abutment, the reaction that is produced between transverse piece 4 and the oscillating arm 2a—2b increases in such manner that, when said transverse piece moves toward said arm, and whatever be the effort exerted on this arm, within the limits of utilization, in the direction opposed to that of arrow F, no positive contact can take place with a shock between the arm and the transverse piece. Of course, the same result could be obtained through other means.

The particular embodiment shown by Figs. 18 and 19 makes is possible to dispense with spring 6, especially when the elastic abutment is interposed between transverse piece 4 and portion 2a of the oscillating arm.

It will be readily understood that, in all cases, under the effect of the inertia of transverse piece 4, link 5 and lever 2a, the free wheel is positively brought into coupling engagement when lever 2b is caused to pivot in the direction of arrow F, and is positively released when this pivoting displacement is imparted in the opposed direction.

Fig. 19 shows the application of the arrangement above described to the case of a mechanism according to Fig. 4, the same reference numbers designating the same parts.

In the mechanism according to Fig. 20, the pivot that materializes point G is given the form of an eccentric 23 made of such a size that link 5 is practically dispensed with.

It should be noted that, in this case, the friction of eccentric 23 in its ring 24 may become such that the pressure that is transmitted to pivot A, instead of being exerted along a line AG, is exerted in a direction inclined with respect to AG, as in the embodiment of Fig. 7.

Finally, Figs. 21 and 22 show a mechanism similar to that of Fig. 20, but in which pivot A is dispensed with so that ring 24 is merely applied against member 4. In this modification ring 24 is provided with teeth meshing with corresponding teeth of rim 3 so that the point of contact of ring 24 with transverse member 4 tends to have a motion represented by curve $a$.

The eccentricities may, in this case, be great, as the point of contact between ring 24 and transverse piece 4 can normally be beyond the theoretical axis BC of this transverse piece. This is accomplished as shown in Fig. 22 by transverse piece 4 of U-shaped cross section with the contact of ring 24 being at a concavity in the upper surface of the lower part of piece 4.

Anyway, the bars must be so made as to be able to resist bending fatigue and wear at their ends.

In normal cases, it will suffice to choose a steel of high mechanical properties and adapted to be case hardened.

By case-hardening only the surfaces that are to slide against the rim, the necessary hardness and resistance to wear will be locally obtained without reducing the characteristics of resistance to bending fatigue of the bar itself.

It is also possible to proceed as shown by Fig. 23 in which there is fixed to the end of each bar, by brazing or welding, a shoe of a special metal of great hardness and capable of resisting wear and tear.

Special metal can also be provided at the end of each bar, for instance by arc welding, as shown by Fig. 24.

Finally, suitable shoes might be secured to the ends of the bars, by riveting or in any other way, as shown by Figs. 13 and 14.

Whatever be the particular construction that is chosen, the working of the device according to the present invention results sufficiently clearly from the preceding description for making it unnecessary to enter into further explanations.

Of course, the devices according to the invention are reversible and it is clear that if rim 3 is given a movement in a direction opposed to that of arrow F, the whole is made rigid and arm 2 is driven.

On the contrary, if rim 3 is given a movement in the direction of arrow F, lever 2 is not driven and the device is running in free wheel.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A free wheel mechanism which comprises, in combination, two coaxial elements rotatable with respect to each other, one of said elements including a circular drum, the other element including an arm extending diametrically with respect to said drum, a rigid part adapted to bear on the wall of said drum only at two places thereof located at a distance from each other smaller than the diameter of said drum wall, a member pivotally mounted on said arm about an eccentric point thereof, and means for interconnecting said member and said part adapted to cause wedging of said part against said drum for one direction of rotation of one of said elements and free relative movement of said part with respect to said drum for the opposed direction of rotation of said element.

2. A free wheel mechanism which comprises, in combination, two coaxial elements rotatable with respect to each other, one of said elements including a circular drum, the other element including an arm extending diametrically with respect to said drum, a rigid part adapted to bear on the wall of said drum only at two places thereof located at a distance from each other smaller than the diameter of said drum wall, a link pivoted to said arm at an eccentric point thereof, and means for interconnecting said link and said part, adapted to cause wedging of said part against said drum for one direction of rotation of one of said elements and free relative movement of said part with respect to said drum for the opposed direction of rotation of said element, said means including a bar pivoted at one end to said rigid part and adapted to bear at its other end against said drum wall.

3. A free wheel mechanism which comprises, in combination, two coaxial elements rotatable with respect to each other, one of said elements including a circular drum, the other element including an arm extending diametrally with respect to said drum, a rigid part adapted to bear on the wall of said drum only at two places thereof located at a distance from each other smaller than the diameter of said drum wall, a link pivoted to said arm at an eccentric point thereof, and means for interconnecting said link and said part adapted to cause wedging of said part against said drum for one direction of rotation of one of said elements and free relative movement of said part with respect to said drum for the opposed direction of rotation of said element, said means including two bars pivoted one to said rigid part and the other to said link, respectively, and having each an end that bears against said drum wall, and means for interconnecting said two bars.

4. A free wheel mechanism which comprises, in combination, two coaxial elements rotatable with respect to each other, one of said elements including a circular drum, the other element including an arm extending diametrally with respect to said drum, a rigid part adapted to bear on the wall of said drum only at two places thereof located at a distance from each other smaller than the diameter of said drum wall, a link pivoted to said arm at an eccentric point thereof, and means for interconnecting said link and said part adapted to cause wedging of said part against said drum for one direction of rotation of one of said elements and free relative movement of said part with respect to said drum for the opposed direction of rotation of said element, said means including one bar pivoted to said rigid part and a second bar pivoted to both of said link and said first mentioned bar and adapted to bear, through its respective ends, against said drum wall.

5. A free wheel mechanism which comprises, in combination, two coaxial elements rotatable with respect to each other, one of said elements including a circular drum, the other element including an arm extending diametrally with respect to said drum, a rigid part adapted to bear on the wall of said drum only at two places thereof located at a distance from each other smaller than the diameter of said drum wall, a member pivotally mounted on said arm about an eccentric point thereof, means for interconnecting said member and said part adapted to cause wedging of said part against said drum for one direction of rotation of one of said elements and free relative movement of said part with respect to said drum for the opposed direction of rotation of said element, and elastic means between said arm and said rigid part for unwedging said part from said drum wall for the last mentioned direction of rotation of said element.

6. A free wheel mechanism which comprises, in combination, two coaxial elements rotatable with respect to each other, one of said elements including a circular drum, the other element including an arm extending diametrally with respect to said drum, a rigid part adapted to bear on the wall of said drum at two respective points thereof located at a distance from each other smaller than the diameter of said drum wall, a member pivotally mounted on said arm about an eccentric point thereof, means for interconnecting said member and said part adapted to cause wedging of said part against said drum for one direction of rotation of one of said elements and free relative movement of said part with respect to said drum for the opposed direction of rotation of said element, and elastic means between said arm and said rigid part for unwedging said part from said drum wall for the last mentioned direction of rotation of said element.

7. A free wheel mechanism which comprises, in combination, two coaxial elements rotatable with respect to each other, one of said elements including a circular drum, the other element including an arm extending diametrally with respect to said drum, a rigid part adapted to bear on the wall of said drum only at two places thereof located at a distance from each other smaller than the diameter of said drum wall, a link pivoted to said arm at an eccentric point thereof, means for interconnecting said link and said part, adapted to cause wedging of said part against said drum for one direction of rotation of one of said elements and free relative movement of said part with respect to said drum for the opposed direction of rotation of said element, said means including a bar pivoted at one end to said rigid part and adapted to bear at its other end against said drum wall, and elastic means between said arm and said rigid part for unwedging said part from said drum wall for the last mentioned direction of rotation of said element.

8. A free wheel mechanism which comprises, in combination, two coaxial elements rotatable with respect to each other, one of said elements including a circular drum, the other element including an arm extending diametrally with respect to said drum, a rigid part adapted to bear on the wall of said drum only at two places thereof located at a distance from each other smaller than the diameter of said drum wall, a link pivoted to said arm at an eccentric point thereof, means for interconnecting said link and said part adapted to cause wedging of said part against said drum for one direction of rotation of one of said elements and free relative movement of said part with respect to said drum for the opposed direction of rotation of said element, said means including two bars pivoted one to said rigid part and the other to said link, respectively, and having each an end that bears against said drum wall, means for interconnecting said two bars and elastic means between said arm and said diametrically extending rigid part for unwedging said part from said drum wall for the last mentioned direction of rotation of said element.

9. A free wheel mechanism which comprises, in combination, two coaxial elements rotatable with respect to each other, one of said elements including a circular drum, the other element including an arm extending diametrally with respect to said drum, a rigid part adapted to bear on the wall of said drum only at two places thereof located at a distance from each other smaller than the diameter of said drum wall, a link pivoted to said arm at an eccentric point thereof, means for interconnecting said link and said part adapted to cause wedging of said part against said drum for one direction of rotation of one of said elements and free relative movement of said part with respect to said drum for the opposed direction of rotation of said element, said means including one bar pivoted to said rigid part and a second bar pivoted to both of said link and said first mentioned bar and adapted to bear, through its respective ends, against said drum wall, and elastic means between said diametrically extending arm and said rigid part for unwedging said rigid part from said drum wall for the last mentioned direction of rotation of said element.

10. A free wheel mechanism which comprises, in combination, two coaxial elements rotatable with respect to each other, one of said elements including a circular drum, a rigid part adapted to bear against the wall of said drum, and means for interconnecting sid part and the other element adapted to cause wedging of said part against said drum for one direction of rotation of one of said elements and free relative movement of said part with respect to said drum for the opposed direction of rotation of the same element, said means including at least one lever adapted to be wedged against said drum when said rigid part is itself wedged against the drum wall.

11. A free wheel mechanism which comprises, in combination, two coaxial elements rotatable with respect to each other, one of said elements including a circular drum, a rigid part adapted to bear against the wall of said drum at only two places, the distance between said places being smaller than the diameter of said drum wall, and means for interconnecting said part and the other element adapted to cause wedging of said part against said drum for one direction of rotation of one of said elements and free relative movement of said part with respect to said drum for the opposed direction of rotation of the same element, said means including at least two levers, the first lever being pivoted to said part at a fixed point thereof and bearing against said drum wall, and the last lever being movably connected with said other element, each lever, starting from the second one, being pivoted to the preceding one and bearing against said drum wall so as to be wedged against said drum wall when said rigid part is wedged.

12. A free wheel mechanism which comprises, in combination, two coaxial elements rotatable with respect to each other, one of said elements including a circular drum, a rigid part adapted to bear against the wall of said drum at only two places, the distance between said places being smaller than the diameter of said drum wall, and means for interconnecting said part and the other element adapted to cause wedging of said part against said drum for one direction of rotation of one of said elements and free relative movement of said part with respect to said drum for the opposed direction of rotation of the same element, said means including at least two arcuate levers having their concavity facing toward the axis of said drum, the first arcuate lever being pivoted to said part at a fixed point thereof and bearing against said drum wall, and the last arcuate lever being movably connected with said other element, each lever, starting from the second one, being pivoted to the preceding one and bearing against said drum wall so as to be wedged against said drum wall when said rigid part is wedged.

13. A free wheel mechanism which comprises, in combination, two coaxial elements rotatable with respect to each other, one of said elements including a circular drum, a rigid part adapted to bear on the wall of said drum at only two separate places thereof located at a distance from each other smaller than the diameter of said drum wall, and lever means for interconnecting said part and the other element and adapted to cause wedging of said part against said drum for one direction of rotation of one of said elements and free relative movement of said part with respect to said drum for the opposed direction of rotation of said element, said rigid part being made of two portions displaceable with respect to each other, and locking means for keeping said portions in the desired relation to each other for operation.

14. A free wheel mechanism according to claim 12 in which said arm includes a hub extending axially in said drum in the central space left free between said arcuate levers and said rigid part, the play between the outer wall of said hub and the inner edges of said arcuate levers and said rigid part being small to limit the angular displacements of said levers and said rigid part in the unwedging direction.

15. A free wheel mechanism which comprises, in combination, two coaxial elements, to wit a driving one and a driven one, rotatable with respect to each other, the driven element including a circular drum, the driving element including an arm extending diametrally with respect to said drum, said arm being made of two portions, one of said portions rotating about the axis of the drum and the second partion being constituted by a lever pivoted to the first portion about a pivot axis parallel to the drum axis, said lever extending on both sides of said pivot axis and having the driving torque applied to the end thereof farthest from said drum axis, a rigid piece adapted to bear on the wall of said drum only at two places thereof located at a distance from each other smaller than the diameter of said drum wall, a link interposed between the other end of said lever and a point of said piece near one of the ends thereof, a member pivotally mounted on said first mentioned portion of said arm about an eccentric point thereof and means for interconnecting said member and a point of said piece toward the other end thereof adapted to cause wedging of said piece against said drum for one direction of rotation of said arm and free relative movement of said piece with respect to said drum for the opposed direction of rotation of said arm.

16. A free wheel mechanism which comprises, in combination, two coaxial elements, to wit a driving one and a driven one, rotatable with respect to each other, the driven element including a circular drum, the driving element including an arm extending diametrally with respect to said drum, said arm being made of two portions, one of said portions rotating about the axis of the drum and the second portion being constituted by a lever pivoted to the first portion about a pivot axis parallel to the drum axis, said lever extending on both sides of said pivot axis and having the driving torque applied to the end thereof farthest from said drum axis, a rigid piece adapted to bear on the wall of said drum only at two places thereof located at a distance from each other smaller than the diameter of said drum wall, a link interposed between the other end of said lever and a point of said piece near one of the ends thereof, a member pivotally mounted on said first mentioned portion of said arm about an eccentric point thereof and means for interconnecting said member and a point of said piece toward the other end thereof adapted to cause wedging of said piece against said drum for one direction of rotation of said arm and free relative movement of said piece with respect to said drum for the opposed direction of rotation of said arm, said means including two bars pivoted one to said rigid piece and the other to said member and having each one end that bear against said drum wall, said two bars being pivotally connected with each other.

LEO ROBIN.

REFERENCES CITED

The following references are of record in the file of this patent:

UNITED STATES PATENTS

| Number | Name | Date |
|---|---|---|
| 55,847 | Galleth | June 26, 1866 |
| 247,866 | Wood | Oct. 4, 1881 |
| 247,896 | Ellis et al. | Oct. 4, 1881 |
| 630,882 | Haber | Aug. 15, 1899 |
| 1,912,407 | Sahli | June 6, 1933 |
| 2,297,166 | Robin et al. | Sept. 29, 1942 |

FOREIGN PATENTS

| Number | Country | Date |
|---|---|---|
| 331,780 | France | June 26, 1866 |
| 556,921 | France | Apr. 24, 1923 |